United States Patent [19]

Winner, Jr.

[11] Patent Number: 5,755,123

[45] Date of Patent: May 26, 1998

[54] STEERING WHEEL PROTECTION DEVICE

[75] Inventor: James E. Winner, Jr., Hollywood Beach, Fla.

[73] Assignee: Winner International Royalty Corporation, Sharon, Pa.

[21] Appl. No.: 541,463

[22] Filed: Oct. 10, 1995

[51] Int. Cl.$^6$ .............................................. B60R 25/02
[52] U.S. Cl. ............................ 70/209; 70/226; 70/238
[58] Field of Search ........................ 70/209–212, 225, 70/226, 237, 238, 14, 18, 19, 416, 417, 163, 164, 167, 158

[56] References Cited

U.S. PATENT DOCUMENTS

| | | | |
|---|---|---|---|
| D. 289,491 | 4/1987 | Johnson | D8/330 |
| D. 306,252 | 2/1990 | Johnson | D8/331 |
| 475,305 | 5/1892 | Follett. | |
| 1,044,387 | 11/1912 | Hodge. | |
| 1,142,780 | 6/1915 | Younger. | |
| 1,154,389 | 9/1915 | Fogalsang. | |
| 1,168,146 | 1/1916 | Baines. | |
| 1,329,913 | 2/1920 | McGuire. | |
| 1,368,054 | 2/1921 | Recher. | |
| 1,388,691 | 8/1921 | Bergen. | |
| 1,395,532 | 11/1921 | Tilden. | |
| 2,458,002 | 10/1949 | Kaskaras | 70/211 |
| 2,491,609 | 2/1949 | George | 74/552 |
| 2,662,961 | 8/1854 | Sargent | 219/19 |
| 3,274,851 | 9/1966 | Geller | 74/552 |
| 3,982,602 | 9/1976 | Gorman | 180/114 |
| 4,166,400 | 9/1979 | Manning et al. | 74/552 |
| 4,186,576 | 2/1980 | Means et al. | 70/233 |
| 4,327,601 | 5/1982 | Vivian, Jr. | 74/552 |
| 4,413,490 | 11/1983 | Nielsen, Jr. . | |
| 4,738,127 | 4/1988 | Johnson | 70/209 |
| 4,777,811 | 10/1988 | Binkley et al. | 70/178 |
| 4,800,775 | 1/1989 | Juchi | 74/552 |
| 4,856,308 | 8/1989 | Johnson | 70/209 |
| 4,935,047 | 6/1990 | Wu | 70/209 |
| 4,961,331 | 10/1990 | Winner | 70/209 |
| 5,007,259 | 4/1991 | Mellard | 70/209 |
| 5,031,429 | 7/1991 | Wang. | |
| 5,115,652 | 5/1992 | Starmer | 70/209 |
| 5,199,284 | 4/1993 | Lin | 70/209 |
| 5,275,030 | 1/1994 | Cole | 70/209 |
| 5,297,406 | 3/1994 | Lin | 70/209 |
| 5,353,614 | 10/1994 | Anderson | 70/209 |
| 5,381,679 | 1/1995 | Cummins | 70/209 |
| 5,415,018 | 5/1995 | Ferrante | 70/209 |
| 5,431,033 | 7/1995 | Barrett | 70/209 |
| 5,450,736 | 9/1995 | Volkmar | 70/209 |
| 5,454,240 | 10/1995 | Whitney | 70/209 |
| 5,454,243 | 10/1995 | Impastato | 70/226 X |
| 5,537,847 | 7/1996 | Dalton et al. | 70/209 |
| 5,540,067 | 7/1996 | Kim | 70/226 X |
| 5,548,983 | 8/1996 | Hart | 70/209 |
| 5,613,383 | 3/1997 | Banez. | |
| 5,619,873 | 4/1997 | Wood | 70/209 |

FOREIGN PATENT DOCUMENTS

| | | | |
|---|---|---|---|
| 562201 | 1/1983 | Australia. | |
| 919367 | 11/1946 | France. | |
| 2501134 | 3/1981 | France. | |
| 2487275 | 1/1982 | France. | |
| 2580243 | 10/1986 | France. | |
| 389215 | 1/1924 | Germany. | |
| 684481 | 11/1939 | Germany. | |
| 2718291 | 10/1978 | Germany. | |
| 584555 | 10/1958 | Italy. | |
| 228807 | 2/1994 | Taiwan. | |
| 361686 | 11/1931 | United Kingdom. | |
| 2110175 | 6/1983 | United Kingdom. | |
| 2206552 | 1/1989 | United Kingdom | 70/226 |
| 9204211 | 3/1992 | WIPO. | |

OTHER PUBLICATIONS

Box Container of "The Cap", by Etc'cessories.

*Primary Examiner*—Suzanne Dino
*Attorney, Agent, or Firm*—Vickers, Daniels & Young

[57] ABSTRACT

A motor vehicle security device for protecting against the cutting of an automobile steering wheel which includes a protective member made of cut-resistant material for covering the steering wheel rim and a connector for attaching the protective member to the steering wheel rim. The protective member radially and circumferentially overlies the steering wheel rim to limit access to the rim and protect against cutting of the rim. The protective member is collapsible for convenient storage.

49 Claims, 5 Drawing Sheets

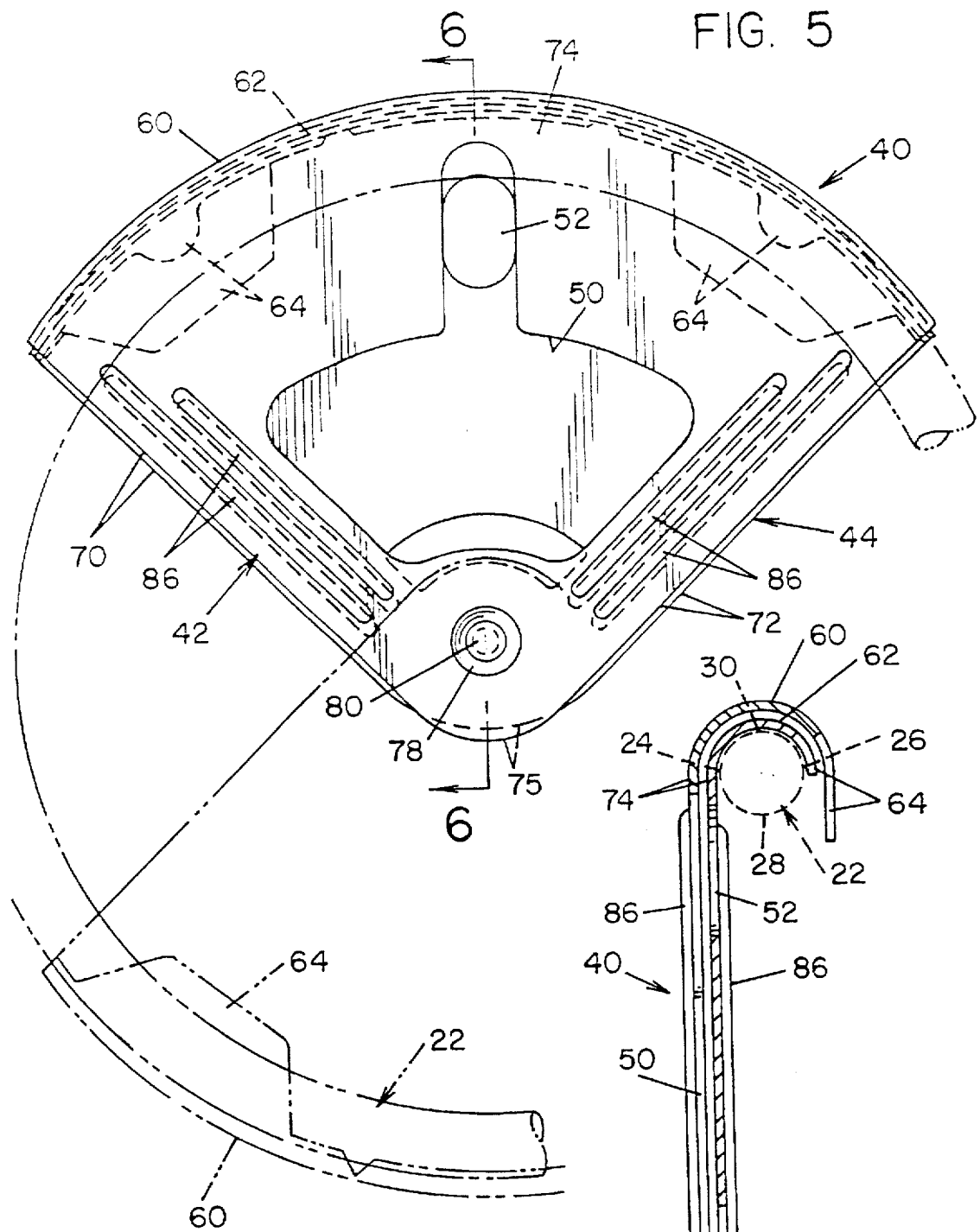

STEERING WHEEL PROTECTION DEVICE

The present invention relates to the art of anti-theft devices for motor vehicles and, more particularly, to a vehicle security device which protects against unauthorized operation and theft of the vehicle by limiting access to the steering wheel.

INCORPORATION BY REFERENCE

U.S. Pat. Nos. Des. 289,491 dated Apr. 28, 1987; 4,738,127 dated Apr. 19, 1988; 4,856,308 dated Aug. 15, 1989; Des. 306,252 dated Feb. 27, 1990; 4,935,047 dated Jun. 19, 1990; and 4,961,331 dated Oct. 9, 1990 are incorporated by reference herein and illustrate types of mechanical security devices which are a part of or can be used in conjunction with the present invention.

BACKGROUND OF THE INVENTION

Over the past several years, there has been a growing demand by vehicle owners to better secure their vehicles against theft. Factors such as inconveniences and insurance premiums associated with the theft of a vehicle or vehicle components have resulted in a demand for mechanisms to better secure a vehicle. In an effort to solve these security problems and demands, a substantial industry has been developed to manufacture and promote various mechanisms which deter theft of a vehicle. Common vehicle security mechanisms include electronic devices such as alarms and so called "killer" switches which disable the engine and/or ignition of a vehicle unless bypassed by the authorized operator. Mechanical devices such as steering wheel locks, which inhibit unauthorized operation of the vehicle by constraining the steering wheel against rotation when locked in position, are also available. However, all these vehicle security systems suffer from numerous disadvantages in terms of cost, convenience and effectiveness.

Electronic alarms for motor vehicles have become well known in recent years and also have many disadvantages associated with their use. Such alarms are designed to be highly sensitive to physical force and/or motion and activate the alarm when the vehicle is disturbed in any way. Consequently, such alarms are frequently activated accidentally by parking lot and service station attendants and/or the owners themselves who neglect to deactivate the alarm system. The electronic alarms are also prone to malfunction and tend to drain the battery of the vehicle. Finally, many of these electronic alarms require professional installation, which is of high cost to a purchaser.

So called "killer" switches have also become popular in recent years. These switches serve to disable the vehicle usually at the ignition system, unless the authorized operator deactivates the killer switch. These types of systems are very costly and suffer from the usual reliability problems associated with electronic devices installed in a motor vehicle. In addition, these devices require professional retailers to install the device after the vehicle leaves the manufacturing plant for a substantial labor charge, since many of these systems are too complex for the general public to self-assemble. In addition, due to the complexity of these systems, a typical motorist is not knowledgeable regarding the deactivation of the system in case of a malfunction.

Vehicle security systems also include mechanical anti-theft devices which restrain relative movement of various components within the vehicle such as a steering wheel, gas pedal, clutch or brake. Many of these mechanical designs include mechanical locks comprising a pair of hooks at opposite ends of an elongated locking apparatus whereby the hooks are engaged to the steering wheel rim or the steering wheel rim and another component within the vehicle. These mechanical locks provide vehicle security without the cost and complexity of electronic security systems and further provide the convenience of being usable selectively at the discretion of the motorist, as opposed to being an ever present fixture of the vehicle which must inconveniently be attended to every time the vehicle is operated. Nevertheless, mechanical locks positioned on the steering wheel or on the steering wheel and another component of the vehicle suffer from various short comings which essentially reduce their effectiveness. The hooks and locks are typically made of hardened steel which resists bending, cutting or prying. While the mechanical locks themselves are relatively indestructible and unremovable by a thief, a thief can bypass such a security system by cutting through the steering wheel rim and removing the mechanical security device. A reinforced steering wheel, which resists being cut, can be installed; however, such steering wheel systems require professional installation and can be very expensive. Also, certain vehicles are equipped with specially designed steering wheels that include various features, such as air bags, light switches and cruise control switches. These specially designed steering wheels cannot be replaced by a generic reinforced steering wheel. Further, these specially designed steering wheels have also become susceptible to theft. The growing demand for air bags has created a market for air bags and air bag parts. As a result, thieves are illegally removing the air bag and various air bag components from vehicles. Mechanical locks are not designed to protect vandalism and/or theft of components of steering wheels.

The prior art is thus seen to fail to provide a vehicle security device which is economical, simple, and convenient to use and yet which is thoroughly effective in preventing theft of a vehicle and vandalism to a steering wheel.

SUMMARY OF THE INVENTION

The present invention overcomes the above described disadvantages and others and provides a vehicle security device which is inexpensive, convenient and effective in protecting against theft of a motor vehicle.

In accordance with the principal feature of the present invention, there is provided a vehicle security device for limiting access to a steering wheel. The steering wheel includes a rim having a front face and a back face, an inner edge and an outer edge and an inner edge radius and an outer edge radius. The security device designed to limit the access to the steering wheel includes a face plate which is made up of at least two plate sections and a mechanism for connecting the plate sections together. Each plate section includes a peripheral edge which limits access to the steering wheel rim. The mechanism for connecting the plate sections together allows the plate to rotate within the plane of the face plate. The mechanism for connecting the plate sections also allows the plate sections to rotate between a collapsed and an open position. Each plate section includes at least one opening which is used to connect and secure the plate sections to the steering wheel.

The mechanical arrangement for connecting the plate sections together is generally located at the center of curvature of each plate section. The center of curvature is generally located at the central axis of the face plate. The plate sections are connected such that the sections can move between at least two positions whereby one position is a collapsed position and a second position is a completely open position. The face plate in the completely open position is selected to cover at least the inner edge of the steering wheel rim. Preferably, the distance between the peripheral edge of each plate section when the plate sections are in the completely open position is about 15-18 inches so as to cover at least the inner edge of most foreign and domestic automotive built steering wheels. The face plate is made of a cut resistant material to resist unauthorized users from gaining access to the steering wheel. Preferably, the cut resistant material is a metallic material such as steel, steel alloys or other metal alloy. The metallic material may be hardened to further resist cutting. The face plate is preferably coated with a non-abrasive material such as rubber or plastic to inhibit the oxidation of the metallic material and to reduce or prevent damage to the steering wheel or vehicle when the security device is inserted and removed from the steering wheel.

In accordance with another aspect of the present invention, each plate section has generally similar dimensions. The security device is preferably divided into two plate sections. Each plate section includes two legs having a first and second end and an outer arc of a given radius connected between the first end of each of the two legs. The arc between the two legs forms a peripheral edge for each of the plate sections. The angle between the legs is selected to form an angle of less than 180°. The radius of the outer arc is also selected to be at least equal to and preferably greater than the inner edge radius of the steering wheel rim. The two plate sections are preferably connected at the center of curvature of each plate. Preferably, the plate sections are connected together by a pin or a rivet at the center of curvature of each plate. However, other means may be used to connect the plate sections together.

In accordance with another aspect of the present invention, at least one opening in each of the plate sections are positioned diametrically apart on the security device when the plate sections are positioned in their completely open position. The opening on the plate sections are positioned inwardly from the peripheral edge of each plate section. The openings are sized and positioned on each plate section to allow the plate sections to be connected to a steering wheel by use of a mechanical device such as lock hook device as disclosed in U.S. Pat. Nos. 4,738,127 ; 4,856,308 ; 4,935,047 and 4,961,331. The mechanical hooks preferably include at least one hook which extends through the opening in each plate section and about the inner edge of the steering wheel rim. The mechanical lock hook device may be a device which is separate from the face plate or rigidly connected to the face plate. Once the mechanical lock has been properly installed to secure the face plate to the steering wheel, the mechanical lock maintains the face plate in an open position on the steering wheel thereby protecting the steering wheel from unauthorized users.

Still yet another aspect of the present invention, at least one of the plate sections includes a flange attached to the peripheral edge of the plate section. The flange preferably extends outward from the peripheral edge to further limit access to the steering wheel rim. Furthermore, the flange is preferably attached to substantially the entire peripheral edge of the plate section. The flange can take upon many designs and is preferably cylindrical in shape to provide protection to the outer edge of the steering wheel rim and can also be shaped to protect the outer edge and back face of the rim.

In accordance with another aspect of the present invention, the security device is shaped to accommodate steering wheels which include airbag components which protrude from the face of the steering wheel.

In another aspect of the present invention, the face plate is rigidified to resist bending of the face plate. Rigidification is preferably obtained by hardening material of the plate sections, re-enforcing the face of each plate section and/or corrugating the plate sections.

In accordance with another aspect of the present invention, there is provided a vehicle security device connected to the steering wheel of a motor vehicle which protects the steering wheel rim from being cut and which limits rotation of the steering wheel. The rotation of the steering wheel is preferably limited by a radial protrusion. The radial protrusion is preferably made of a cut resistant material.

The principal object of the present invention is to provide a security device which protects a motor vehicle against theft.

Another object of the present invention is to provide a vehicle steering wheel device which is economical and convenient to use.

Yet another object of the present invention is to provide a vehicle security device which protects the steering wheel from vandalism and unwanted theft.

Still another object of the present invention is to provide a steering wheel security device which limits the access to the steering wheel rim of the steering wheel to prevent cutting or severing of the rim.

Yet another object of the present invention is to provide a steering wheel security device having a flange which further limits access to the steering wheel rim.

Another object of the present invention is to provide a steering wheel and security device which prevents rotation of the steering wheel.

Still yet another object of the present invention is to provide a steering wheel device which can protect all types and shapes of steering wheels.

Another object of the present invention is to provide a vehicle security device which prevents the removal of airbags from the steering wheel.

Yet another object of the present invention is to provide a vehicle security device which can be easily and conveniently stored when not in use.

BRIEF DESCRIPTION OF THE DRAWINGS

The foregoing and other objects of the invention will become apparent from the following description of the preferred embodiments thereof taken together with the accompanying drawings in which:

FIG. 5 is an illustration of the face plate in a collapsed position; and,

FIG. 6 is a cross-sectional view along line 6—6 of FIG. 5.

PREFERRED EMBODIMENTS OF THE INVENTION

Figure 1:
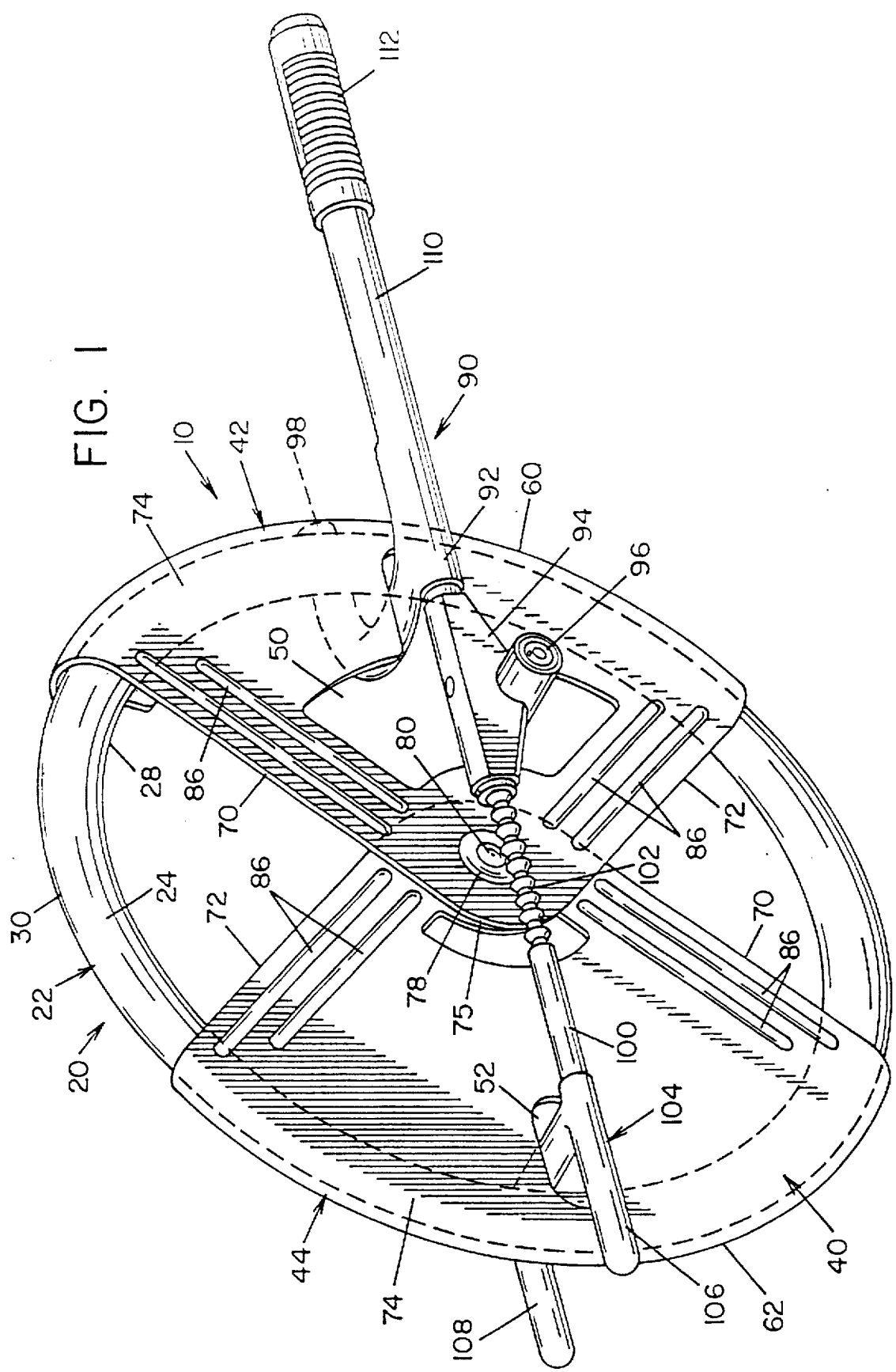
FIG. 1 is a perspective view of a security device in accordance with the present invention.

Referring now to the preferred embodiment of the invention, wherein the showings are only for the purposes of illustrating the preferred embodiments and not for purposes of limiting the same. FIG. 1 illustrates a security device 10 which is designed to limit access to steering wheel 20. Steering wheel 20 includes a steering wheel rim 22 connected to hub 32 by steering wheel spokes 34. Steering wheel rim 22 includes a front face 24, a back face 26, an inner edge 28 and an outer edge 30. Steering wheel rim is preferably circular in shape and the inner edge 28 defines an inner radius of the steering wheel rim and outer edge 30 defines an outer radius of steering wheel rim 22. However, the steering wheel rim may be of shapes other than circular. The outer radius of steering wheel rim 22 is preferably about 15 to 18 inches, wherein such radial dimensions encompasses most domestic and foreign steering wheel configurations. Although not shown, the steering wheel hub may include an airbag for protection of the driver during sudden stops of the vehicle. Hub 32 may also include other steering wheel components such as cruise control component, audio components, etc. Security device 10 includes face plate 40. Face plate 40 is designed to be positioned on front face 24 of steering wheel rim 22 to limit access to the rim by an unauthorized user. Face plate 40 preferably includes plate section 42 and plate section 44. Each of the plate sections are preferably made of a cut resistant material such as carbon steel or stainless steel to make it difficult, if not impossible, for an unauthorized user to cut the plate sections and gain access to steering wheel rim 22. However, other cut resistant materials can be used to form the plate sections.

Each plate section includes a leg 70 and a leg 72, each leg having a first and second end. The angle formed between the two legs is less than 180° and is preferably 45°–135° and more preferably greater than 90°. Each plate section also includes a peripheral edge 74 which is connected between the first end of legs 70, 72. Peripheral edge 74 preferably defines a curvilinear surface between legs 70 and 72. The radius of curvature of peripheral edge 74 is preferably equal to or greater than the radius of curvature of inner edge 28 of steering wheel rim 22. Such a radius size for peripheral edge 74 enables the peripheral edge to protect at least inner edge 28 of the rim when plate sections 42 and 44 are connected to steering wheel 20.

Each plate section preferably includes an inner surface defined by inner arc edge 75 connected between the second end of legs 70, 72. The radius of curvature of the inner arc is preferably less than the radius of curvature of peripheral edge 74. Each plate section is also designed such that the center of curvature of peripheral edge 74 and center of curvature of inner arc edge 75 are generally the same for each plate section. Preferably, the center of curvature is located generally about the central axis of face plate 40.

Plate section 42 and plate section 44 are connected together such that the plate sections can move about the central axis of face plate 40. As shown in FIG. 1, the two plate sections are connected together by rivet 80 which is positioned in connection hole 76 which is located on each of the two plate sections. Preferably, connection hole 76 is located at the center of curvature of peripheral edge 74 of the each plate section. Preferably, rivet 80 is positioned flush with the surface of the plate sections as shown in FIG. 1. To this end, connection hole 76 is preferably depressed into the plate section and a slope surface 78 is formed about connection hole 76.

Plate section 42 and plate section 44 preferably include generally identical dimensions so that the plate sections can be collapsed to minimize the size of the collapsed plate sections as illustrated in FIG. 5.

Figure 4:
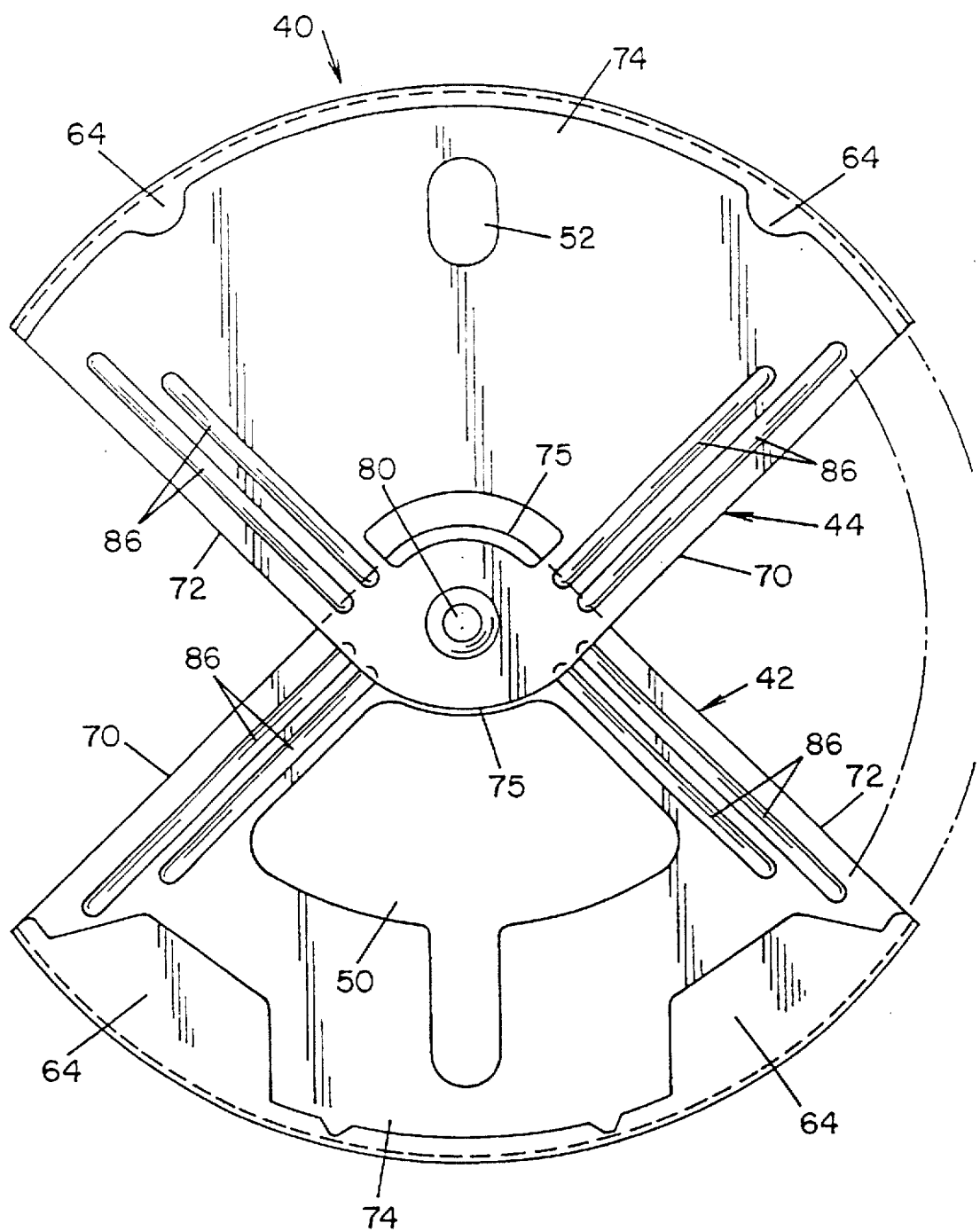
FIG. 4 is a rear plan view of the invention without the attachment mechanism and shows the face plate in an open position.

As best illustrated in FIG. 4, plate section 42 includes opening 50 and plate section 44 includes opening 52. Each of these openings are positioned inwardly from the peripheral edge 74 of each plate section. Opening 50 and opening 52 are designed and shaped to provide access to a mechanical lock which secures the plate sections to steering wheel 20 as shown in FIG. 1. Preferably, opening 50 and opening 52 are symmetrically positioned on the respective plate sections. Such positioning allows the plate sections to be properly attached to steering wheel rim 22 when the plate sections are positioned in their completely opened position. Furthermore, the symmetrical positioning of the openings provides for an aesthetically pleasing steering wheel protection device.

As illustrated in FIG. 1, each plate section preferably includes at least one corrugated surface 86. The corrugated surface rigidifies the plate sections to make the cutting and/or bending of the plate section increasingly difficult if not impossible. The corrugated surfaces also provide for a design on the plate sections to make the plate sections more aesthetically pleasing. The corrugated surfaces 86 are preferably positioned adjacent to the two legs of the plate sections to maximize the rigification effect from the corrugated surfaces 86.

Figure 2:
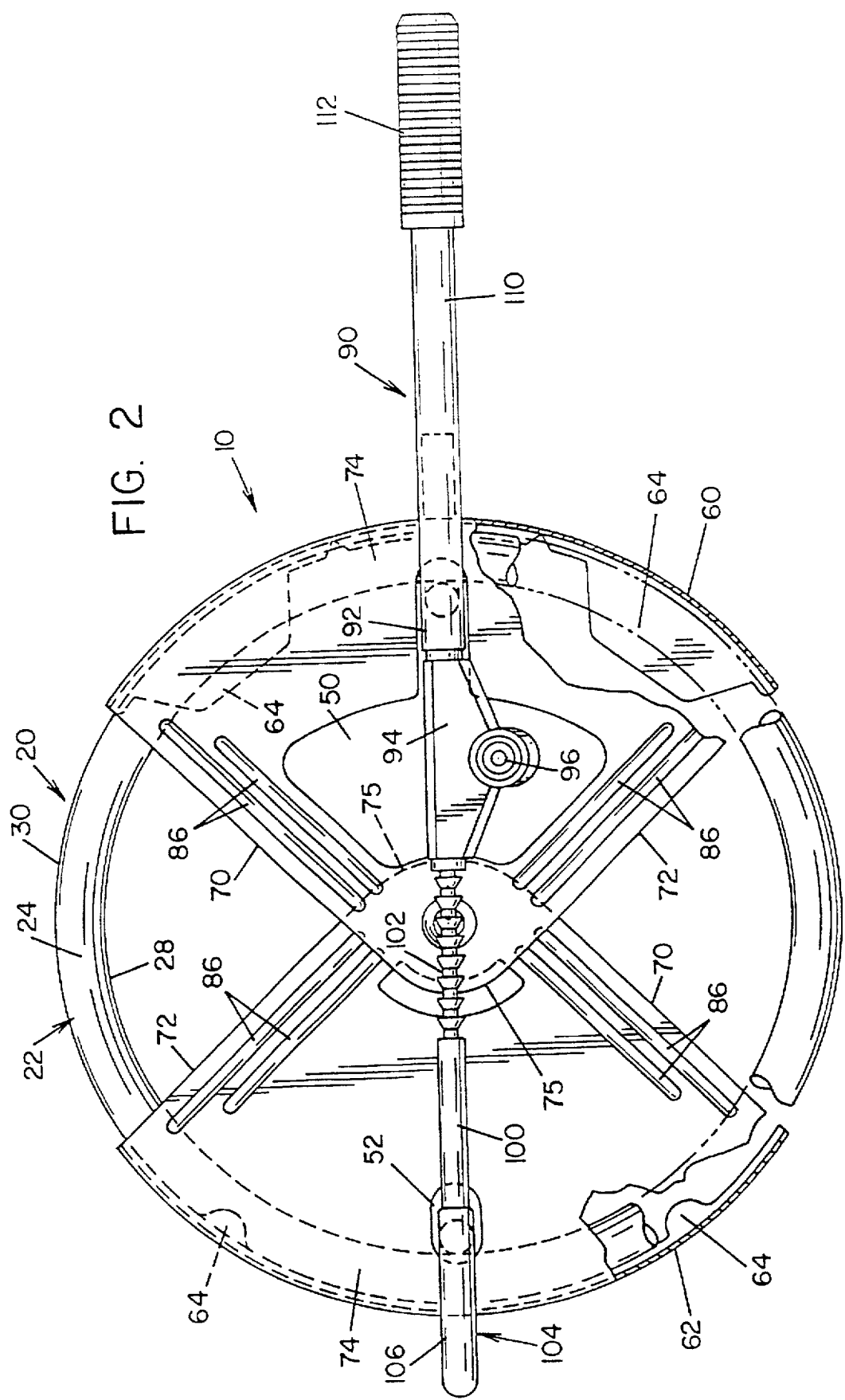
FIG. 2 is a plan view of the invention as shown in FIG. 1.
Figure 3:
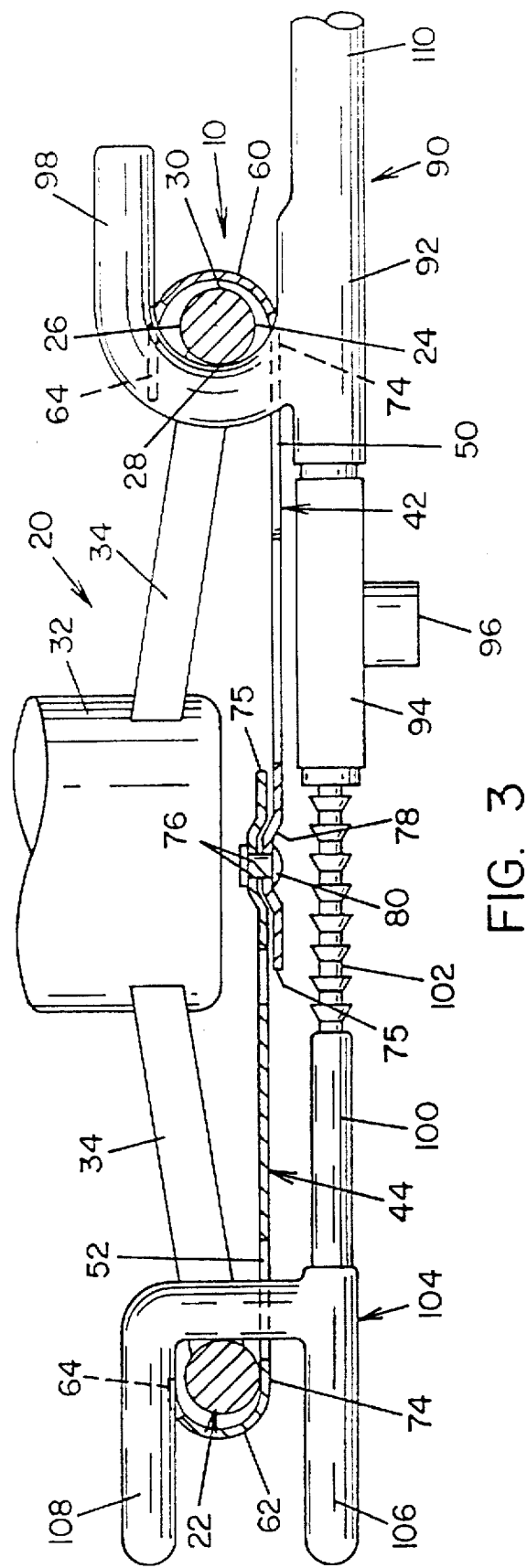
FIG. 3 is a cross-sectional view of the invention as shown in FIG. 2.

Referring now to FIGS. 2–4, the plate section 42 includes flange 60 and plate section 44 includes flange 62. The flange on the respective plate section is designed to provide additional protection to steering wheel rim 22 when face plate 40 is positioned on the steering wheel. The flanges are designed to extend outwardly from peripheral edge 74 of each plate section. Preferably, the flanges are curvilinear in shape so as to be positioned about outer edge 30 of steering wheel rim 22 when the plate section is positioned on the steering wheel rim to further limit access to the steering wheel rim by an unauthorized user. As shown in FIG. 2, the flanges preferably are connected along the complete peripheral edge 74 of each plate section; however, the flange may be selectively positioned along the peripheral edge 74 if desired. The flanges may also be designed to extend about the back face of the steering wheel rim to provide additional protection to the steering wheel rim. The flanges are also designed to assist in securing face plate 40 to the steering wheel when the plate sections are positioned in a completely opened position as will be described more full below. The flanges may also preferably include a flange tab 64. The flange tab is designed to curve about the back face of steering wheel rim 22 to provide protection to the steering wheel rim and to provide means for more conveniently attaching the face plate 40 to the steering wheel rim 22 as will be more fully described below. Flange tab 64 may also be designed to also extend partially about the inner edge of steering wheel rim 22.

Referring again to FIG. 1, face plate 40 is connected to steering wheel 20 by a mechanical lock device 90. Mechanical lock device 90 can be any of a number of mechanical locks which can be attached to a steering wheel. Preferably, the mechanical lock also limits rotation of the steering wheel. Preferably, the mechanical locks similar to the ones provided by Winner International under the trademark THE CLUB. Mechanical lock device 90 includes a tubular body portion 92, a rod member 100 which is dimensioned to move in telescopic fashion within body portion 92. Lock body 92 also includes a key lock 96 and lock housing 94 which are designed to secure rod 100 in position with respect to body portion 92. Rod 100 preferably includes grooves 102 which, as shown in the aforementioned patents, allow rod member 100 to preferably ratchet into position in only one direction when key lock 96 is in the lock position. Mechanical lock 90 also includes two lock hooks 98 and 104 respectively positioned on body portion 92 and rod member 100. As illustrated in FIG. 1, lock hooks 98 and 104 have a U-shape design and are opened outwardly relative to one another. Lock body 92 also includes extension arm 110 which is designed to limit the rotation of steering wheel 20 when the mechanical lock device is attached to the steering wheel. The end of extension arm 110 is connected a handle 112. Handle 112 is preferably a plastic gripper which slips over the end of extension arm 110 and provides for easy handling and operation by an authorized user of the mechanical lock device 90. Hook 104 includes an upper hook leg 106 and a lower hook leg 108. The two hook legs are designed to maintain the plate section 44 onto steering wheel 22, which will hereinafter be described below. Mechanical lock 90 is made of a material, such as hardened steel, which resists cutting by a saw or bolt cutter.

The operation of the preferred embodiment of the security device will now be described. As illustrated in FIGS. 4–6, face plate 40 can be moved into a collapsed position whereby plate section 42 overlies plate section 44. The flanges of the two plate sections are designed such that the radius of curvature of flange 60 is greater than the radius of curvature of flange 62 so that when the two plate sections are collapsed into the closed position as shown in FIGS. 5 and 6, the flanges overlap one another. The collapsed position of the face plate allows the authorized user to easily store the plate section under the seat or in a small compartment when not in use.

When the operator intends to secure the face plate to the steering wheel, the plate sections are maintained in their closed or collapsed position and are placed preferably on the top portion of steering wheel rim 22. In this position, the flanges and the respective flange tabs are positioned on top of outer edge 30 and back face 26 of steering wheel rim 22. The face plate is then moved into the completely open position by maintaining plate section 44 on the top portion of the rim and rotating plate section 42 about rivet 80 until the two plate sections are oriented symmetrically on the steering wheel rim as illustrated in FIGS. 1 and 2. As the plate section is rotated in the completely open position, flange 60 and the respective flange tab 64 engage the outer edge 30 and back face 26 of steering wheel rim 22. Once the face plate 40 is moved into the completely open position, the flanges and flange tabs on the two plate sections maintain the face plate on the steering wheel rim 22. As readily apparent, the completely open face plate 40 prevents an unauthorized user from gaining access to hub 32 of steering wheel 20 and further limits access to steering wheel rim 22.

Face plate 40 is secured to the steering wheel rim in the completely open position by mechanical lock 90. Although mechanical lock 90 is shown to be a separate component, it will be appreciated that the mechanical lock 90 can be rigidly integrated onto face plate 40 with only minor modifications.

Mechanical lock 90 is secured onto face plate 40 and steering wheel 20 by passing lower hook leg 108 through opening 52. The lower hook leg 108 is then moved until it is positioned at least partially about back face 26 of steering wheel rim 22. The movement of lower hook leg 108 simultaneously positions upper hook leg 106 about the peripheral edge 74 of plate section 44. As is evident from this positioning of hook 104, plate section 44 is secured to steering wheel rim 22. Once hook 104 is secured in the proper position, body portion 92 is ratchetly moved until hook 98 is positioned over opening 50. As shown in FIG. 1, opening 50 is larger than opening 52 since hook 98 must be lowered into opening 50 when hook 104 is positioned in opening 52. Once hook 98 is lowered into opening 50, body portion 92 is ratchetly moved until hook 98 at least partially is about back face 26 of steering wheel rim 22. In this position, body portion 92 is positioned over peripheral edge 74 of plate section 42 thereby securing plate section 42 to steering wheel rim 22. As is readily apparent, once hook 98 and hook 104 are properly positioned in opening 50 and opening 52, respectively, plate section 42 and plate section 44 are maintained in their completely open position and secured to steering wheel rim 22. In this arrangement, mechanical lock 90 is securely attached to steering wheel rim 22 and prevents an unauthorized user from rotating the steering wheel in view of extension arm 110. Face plate 40 cooperates with mechanical lock device 90 by preventing an unauthorized user from gaining access to steering wheel rim 22 and severing the rim to remove mechanical lock device 90 from the steering wheel rim.

The security device 10 is as easily removed from steering wheel 20 by an authorized user as it is being secured to the steering wheel. To remove security device 10, the authorized user unlocks key lock 96 and moves body portion 92 toward hook 104 until hook 98 can be lifted out of opening 50. Once hook 98 is lifted from opening 50, hook 104 is removed from opening 52. Mechanical lock 90 is then stored in its proper place by the authorized user. Face plate 40 is removed from steering wheel rim 22 by rotating plate section 42 about rivet 80 until the two plate sections are in the collapsed position. The plate sections are then lifted off of steering wheel rim 22 and stored in the vehicle by the operator.

The invention has been described with reference to a preferred embodiment and alternates thereof. It is believed that many modifications and alterations to the embodiments discussed will readily suggest themselves to those skilled in the art upon reading and understanding the detailed description of the invention. It is intended to include all such modifications and alterations insofar as they come within the scope of the present invention.

I claim:

1. A vehicle security device adapted to limit access to a steering wheel which steering wheel includes a rim having a front face, a back face, an inner edge, an inner edge radius, and an outer edge, said security device comprising a cut resistant face plate lying in a plate plane and attachment means for connecting said face plate to said steering wheel, said face plate including at least two plate sections and plate connection means for connecting together each of said plate sections, each of said plate sections including two legs wherein each leg has a first end and a second end and an outer arc of a given radius connected between the first end of each leg to form an outer peripheral edge of each plate section and a center of curvature of said outer arc, said outer arc of each of said plate sections having a given radius at least equal to said inner edge radius of said steering wheel, said plate connection means positioned substantially at said center of curvature of each of said plate sections and providing independent rotation of each of said plate sections in said plate plane between a collapsed and a completely open position wherein adjacently positioned plate sections are substantially equally spaced apart, said attachment means including an opening on each of said plate sections and positioned inwardly from said outer peripheral edge of each of said plate sections and spaced on each of said sections to be in a non-overlapping relationship with an adjacent plate section when said plate sections are in said completely open position.

2. A device as defined in claim 1, wherein said two legs of each of said plate sections forming an angle of less than 180°.

3. A device as defined in claim 2, wherein said two legs forming an angle between about 45° to about 135°.

4. A device as defined in claim 3, wherein said angle between said legs is at least about 90°.

5. A device as defined in claim 1, wherein said face plate has two plate sections.

6. A device as defined in claim 2, wherein said face plate has two plate sections.

7. A device as defined in claim 1, wherein each of said two legs of each of said plate sections is substantially the same length and has a length greater than said given radius of said outer arc, said second end of each of said two legs connected to an inner arc having a radius less than said given radius of said outer arc and having a center of curvature at substantially the same point of said center of curvature of said outer arc.

8. A device as defined in claim 2, wherein each of said two legs of each of said plate sections is substantially the same length and has a length greater than said given radius of said outer arc, said second end of each of said two legs connected to an inner arc having a radius less than said given radius of said outer arc and having a center of curvature at substantially the same point of said center of curvature of said outer arc.

9. A device as defined in claim 6, wherein each of said two legs of each of said plate sections is substantially the same length and has a length greater than said given radius of said outer arc, said second end of each of said two legs connected to an inner arc having a radius less than said given radius of said outer arc and having a center of curvature at substantially the same point of said center of curvature of said outer arc.

10. A device as defined in claim 1, wherein said plate connecting means includes a rivet.

11. A device as defined in claim 9, wherein said plate connecting means includes a rivet.

12. A device as in claim 1, wherein said outer arc includes a midpoint having a radial axis positioned equally from the first end of each leg, said plate sections positionable in a completely open position wherein the midpoint of each plate section being diametrically opposed from each other.

13. A device as in claim 6, wherein said outer arc includes a midpoint having a radial axis positioned equally from the first end of each leg, said plate sections positionable in a completely open position wherein the midpoint of each plate section being diametrically opposed from each other.

14. A device as in claim 9, wherein said outer arc includes a midpoint having a radial axis positioned equally from the first end of each leg, said plate sections positionable in a completely open position wherein the midpoint of each plate section being diametrically opposed from each other.

15. A device as in claim 11, wherein said outer arc includes a midpoint having a radial axis positioned equally from the first end of each leg, said plate sections positionable in a completely open position wherein the midpoint of each plate section being diametrically opposed from each other.

16. A device as defined in claim 12, wherein one of said at least one openings is inwardly positioned from said plate midpoint.

17. A device as defined in claim 13, wherein one of said at least one openings is inwardly positioned from said plate midpoint.

18. A device as defined in claim 15, wherein one of said at least one openings is inwardly positioned from said plate midpoint.

19. A device as defined in claim 1, wherein at least one of said plate sections includes flange means attached to the peripheral edge of said plate section and extending outward from said peripheral edge of said plate section.

20. A device as defined in claim 6, wherein at least one of said plate sections includes flange means attached to the peripheral edge of said plate section and extending outward from said peripheral edge of said plate section.

21. A device as defined in claim 9, wherein at least one of said plate sections includes flange means attached to the peripheral edge of said plate section and extending outward from said peripheral edge of said plate section.

22. A device as defined in claim 17, wherein at least one of said plate sections includes flange means attached to the peripheral edge of said plate section and extending outward from said peripheral edge of said plate section.

23. A device as defined in claim 18, wherein at least one of said plate sections includes flange means attached to the peripheral edge of said plate section and extending outward from said peripheral edge of said plate section.

24. A device as defined in claim 19, wherein said flange means are attached to substantially the entire peripheral edge of said plate section.

25. A device as defined in claim 23, wherein said flange means are attached to substantially the entire peripheral edge of said plate section.

26. A device as defined in claim 19, wherein said flange means is adapted to extend at least partially about the outer edge of said steering wheel when said face plate is positioned on said steering wheel.

27. A device as defined in claim 19, wherein said flange means is adapted to extend at least partially about said back face of said steering wheel when said face plate is positioned on said steering wheel.

28. A device as defined in claim 1, wherein said attachment means includes means adapted to extend through each of said openings and about the inner edge of said steering wheel.

29. A device as defined in claim 23, wherein said attachment means includes means adapted to extend through each of said openings and about the inner edge of said steering wheel.

30. A device as defined in claim 28, wherein said attachment means including a hook, said hook having a lower leg and an upper leg, said lower leg adapted to extend through said opening in at least one of said plate sections and at least partially about the back face of said rim, said upper leg adapted to extend at least about the front face of said rim and the peripheral edge of at least one of said plate sections when said lower leg is inserted through said opening.

31. A device as defined in claim 29, wherein said attachment means including a hook, said hook having a lower leg and an upper leg, said lower leg adapted to extend through said opening in at least one of said plate sections and at least partially about the back face of said rim, said upper leg adapted to extend at least about the front face of said rim and the peripheral edge of at least one of said plate sections when said lower leg is inserted through said opening.

32. A device as defined in claim 31, wherein said attachment means including two hooks positioned substantially diametrically apart adapted to extend through said opening in said plate sections.

33. A device as defined in claim 1, wherein said face plate including reinforcement means for rigidifying said face plate.

34. A device as defined in claim 31, wherein said face plate including reinforcement means for rigidifying said face plate.

35. A device as defined in claim 33, wherein said reinforcement means including at least one corrugation in at least one of said plate sections.

36. A device as defined in claim 34, wherein said reinforcement means including at least one corrugation in at least one of said plate sections.

37. A device as defined in claim 35, wherein said at least one corrugation positioned substantially parallel to at least one leg of at least one said plate sections.

38. A device as defined in claim 1, including means for limiting rotation of said steering wheel.

39. A device as defined in claim 36, including means for limiting rotation of said steering wheel.

40. A device as defined in claim 39, wherein said means for limiting rotation extends radially outwardly from the edge of said face plate.

41. A device as defined in claim 40, wherein said means for limiting rotation is connected to said attachment means.

42. A device as defined in claim 40, wherein said attachment means including a hook, said hook having a lower leg and an upper leg, said lower leg adapted to extend through said opening in at least one of said plate sections and at least partially about the back face of said rim, said upper leg adapted to extend at least about the front face of said rim and the peripheral edge of at least one of said plate sections when said lower leg is inserted through said opening.

43. A vehicle security device adapted to limit access to a steering wheel which steering wheel includes a rim having a front face, a back face, an inner edge, an inner edge radius, and an outer edge, said security device comprising a cut resistant face plate lying in a plate plane and attachment means for connecting said face plate to said steering wheel, said face plate including at least two plate sections and plate connection means for connecting together each of said plate sections, each of said plate sections including two legs wherein each leg has a first end and a second end and an outer arc of a given radius connected between the first end of each leg to form an outer peripheral edge of each plate section and a center of curvature of said outer arc, said outer arc of said plate sections having a given radius at least equal to said inner edge radius of said steering wheel, said two legs each having substantially the same length and forming an angle of less than 180° between said two legs of said plate section, said plate connection means positioned substantially at said center of curvature of each of said plate sections and providing independent rotation of each of said plate sections in said plate plane between a collapsed and a completely open position wherein adjacently positioned plate sections are substantially equally spaced apart, said attachment means including an opening on each of said plate sections and positioned inwardly from said outer peripheral edge of each of said plate sections and spaced on each of said sections to be in a non-overlapping relationship with an adjacent plate section when said plate sections are in said completely open position.

44. A device as defined in claim 43, wherein said length of said two legs is greater than said outer arc radius of said plate section.

45. A device as defined in claim 43, wherein at least one of said plate sections includes at least one corrugation.

46. A device as defined in claim 44, wherein at least one of said plate sections includes at least one corrugation.

47. A device as defined in claim 46, wherein said at least one corrugation positioned substantially parallel to at least one leg of at least one said plate sections.

48. A device as defined in claim 43, wherein at least one of said plate sections includes flange means attached to the peripheral edge of said plate section and extending outward from said peripheral edge of said plate section.

49. A device as defined in claim 47, wherein at least one of said plate sections includes flange means attached to the peripheral edge of said plate section and extending outward from said peripheral edge of said plate section.

* * * * *